(12) United States Patent
Hidaka (10) Patent No.: US 6,515,455 B2
(45) Date of Patent: Feb. 4, 2003

(54) APPARATUS FOR STARTING DRIVE OF LOAD BY HIGH-VOLTAGE BATTERY

(75) Inventor: Seiji Hidaka, Anjo (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/935,696

(22) Filed: Aug. 24, 2001

(65) Prior Publication Data

US 2002/0024320 A1 Feb. 28, 2002

(30) Foreign Application Priority Data

Aug. 25, 2000 (JP) ........................................ 2000-255873

(51) Int. Cl.$^7$ .............................. H02J 7/00; H02H 7/18
(52) U.S. Cl. ...................................... 320/135; 307/10.7
(58) Field of Search ......................... 320/135; 307/10.1, 307/10.7, 20; 322/8

(56) References Cited

U.S. PATENT DOCUMENTS 5,323,102 A * 6/1994 Torii et al. .................... 322/90
5,355,071 A * 10/1994 Ishida et al. ................. 320/110
5,635,771 A * 6/1997 Mertl et al. ................. 307/10.1

* cited by examiner

Primary Examiner—Gregory J. Toatley, Jr.
(74) Attorney, Agent, or Firm—Oliff & Berridge, PLC (57) ABSTRACT

A combination battery includes a plurality of cells connected together in series. A switching element operates for selectively blocking and unblocking a power feed path between the combination battery and a load. The switching element is changed to its on state when receiving a drive voltage. When a starting switch is moved to its on position, a drive circuit is connected with at least one cell among the cells in the combination battery and uses the at least one cell as a power source to generate the drive voltage applied to the switching element. A power supply circuit receives an output voltage from the combination battery and starts to operate when the switching element is changed to its on state. At a later moment, a power source for setting the switching element in its on state is changed from the at least one cell to the power supply circuit.

7 Claims, 5 Drawing Sheets

APPARATUS FOR STARTING DRIVE OF LOAD BY HIGH-VOLTAGE BATTERY

BACKGROUND OF THE INVENTION

1. Field of the Invention

This invention relates to an apparatus for starting the drive of a load by a high-voltage battery. This invention particularly relates to an apparatus designed so that the voltage of a high-voltage battery is applied to a load when a switching element is moved to its on state.

2. Description of the Related Art

A typical mobile robot includes a motor for moving a robot body, and a motor for driving a robot arm. When the robot is connected with an external power supply, the motors are activated by the external power supply. The robot has an internal power supply using a lead-acid battery. During movement of the robot body, the robot remains disconnected from the external power supply, and the motors are activated by the internal power supply.

Generally, the motors in the robot are of the AC (alternating current) type. The robot includes an inverter which can receive DC (direct current) power from the internal power supply. The inverter converts the DC power into AC power fed to the motors. In general, the rating drive voltage for the motors is 200 V while the voltage of the internal power supply is 24 V. In this case, the voltage of the internal power supply is boosted to 280 V, and the 280-V DC power is fed to the inverter.

The degree of the voltage boost (24 V to 280 V) is relatively high. Therefore, the voltage boost causes a considerable energy loss. As a result, the internal power supply is required to be frequently charged, and the availability factor of the robot tends to be low.

It is conceivable to replace the 24-V internal power supply with a 280-V internal power supply. In this case, the voltage of the internal power supply is directly applied to the inverter. Thus, it is unnecessary to boost the voltage of the internal power supply. The 280-V internal power supply consists of a combination battery or a high-voltage battery having cells coupled together in series.

The inverter is selectively connected with and disconnected from the internal power supply by a switching element using a semiconductor switching device. The voltage across the 280-V internal power supply is too high to drive the semiconductor switching device. Thus, it is necessary to provide an auxiliary low-voltage battery for driving the semiconductor switching device. The auxiliary low-voltage battery increases the weight of the robot.

SUMMARY OF THE INVENTION

It is an object of this invention to provide an apparatus for starting the drive of a load by a high-voltage battery which dispenses with an auxiliary low-voltage battery for driving a switching device.

A first aspect of this invention provides an apparatus for starting the drive of a load by a high-voltage battery. The apparatus comprises a combination battery including a plurality of cells connected together in series; a power feed path between the combination battery and the load; a switching element for selectively blocking and unblocking the power feed path, the switching element being changed to its on state when receiving a drive voltage; a starting switch; a drive circuit connected with at least one cell among the cells in the combination battery and using said at least one cell as a power source to generate the drive voltage when the starting switch is moved to its on position, the drive circuit applying the drive voltage to the switching element; a power supply circuit connected with the power feed path and the switching element, and receiving an output voltage from the combination battery and starting to operate when the switching element is changed to its on state, the power supply circuit dropping the output voltage from the combination battery to generate a dropped voltage; and means for changing a power source for setting the switching element in its on state from said at least one cell to the power supply circuit in response to the dropped voltage generated by the power supply circuit.

A second aspect of this invention is based on the first aspect thereof, and provides an apparatus wherein the changing means comprises a relay including a drive coil and a relay switch, and the relay switch changes the power source for setting the switching element in its on state from said at least one cell to the power supply circuit when the dropped voltage generated by the power supply circuit is applied to the drive coil.

A third aspect of this invention is based on the first aspect thereof, and provides an apparatus wherein the changing means comprises 1) means for setting the dropped voltage generated by the power supply circuit to a level higher than an output voltage of said at least one cell, and 2) means for connecting the drive circuit to both said at least one cell and the power supply circuit, wherein the output voltage of said at least one cell is applied to the drive circuit and the switching element is changed to its on state when the starting switch is moved to its on position, and wherein after the power supply circuit is started to operate, the dropped voltage generated by the power supply circuit is applied to the drive circuit and the switching element is kept in its on state.

A fourth aspect of this invention is based on the third aspect thereof, and provides an apparatus further comprising a rectifying element provided in a power feed line connected between the drive circuit and said at least one cell, the rectifying element allowing a flow of a current from said at least one cell to the drive circuit and blocking a flow of a current from the drive circuit to said at least one cell.

A fifth aspect of this invention is based on the first aspect thereof, and provides an apparatus further comprising means provided in a power feed line between the changing means and said at least one cell for sensing a current flowing in the power feed line, and detecting a changing state of the changing means in response to the sensed current.

A sixth aspect of this invention is based on the first aspect thereof, and provides an apparatus further comprising a rectifying circuit for converting an AC power into a DC power, and means for feeding the DC power to the load.

A seventh aspect of this invention provides an apparatus for starting the drive of a load by a high-voltage battery. The apparatus comprises a combination battery including a plurality of cells connected together in series, the combination battery having a tap between its hot end and its cold end; a power feed path between the combination battery and the load; a switching element being changed to an on state when receiving a drive voltage, and being changed to an off state when being released from the drive voltage, the switching element unblocking the power feed path when being changed to the on state, and blocking the power feed patch when being changed to the off state; a starting switch movable to an on position; first means for, when the starting switch moves to the on position, generating a first control voltage from a voltage at the tap of the combination battery and applying the first control voltage to the switching element as the drive voltage to change the switching element to the on state; second means for generating a second control voltage from an output voltage of the combination battery when the switching element is changed to the on state by the first means; and third means for applying the second control voltage to the switching element as the drive voltage instead of the first control voltage to keep the switching element in the on state.

DETAILED DESCRIPTION OF THE INVENTION

First Embodiment

Figure 1:
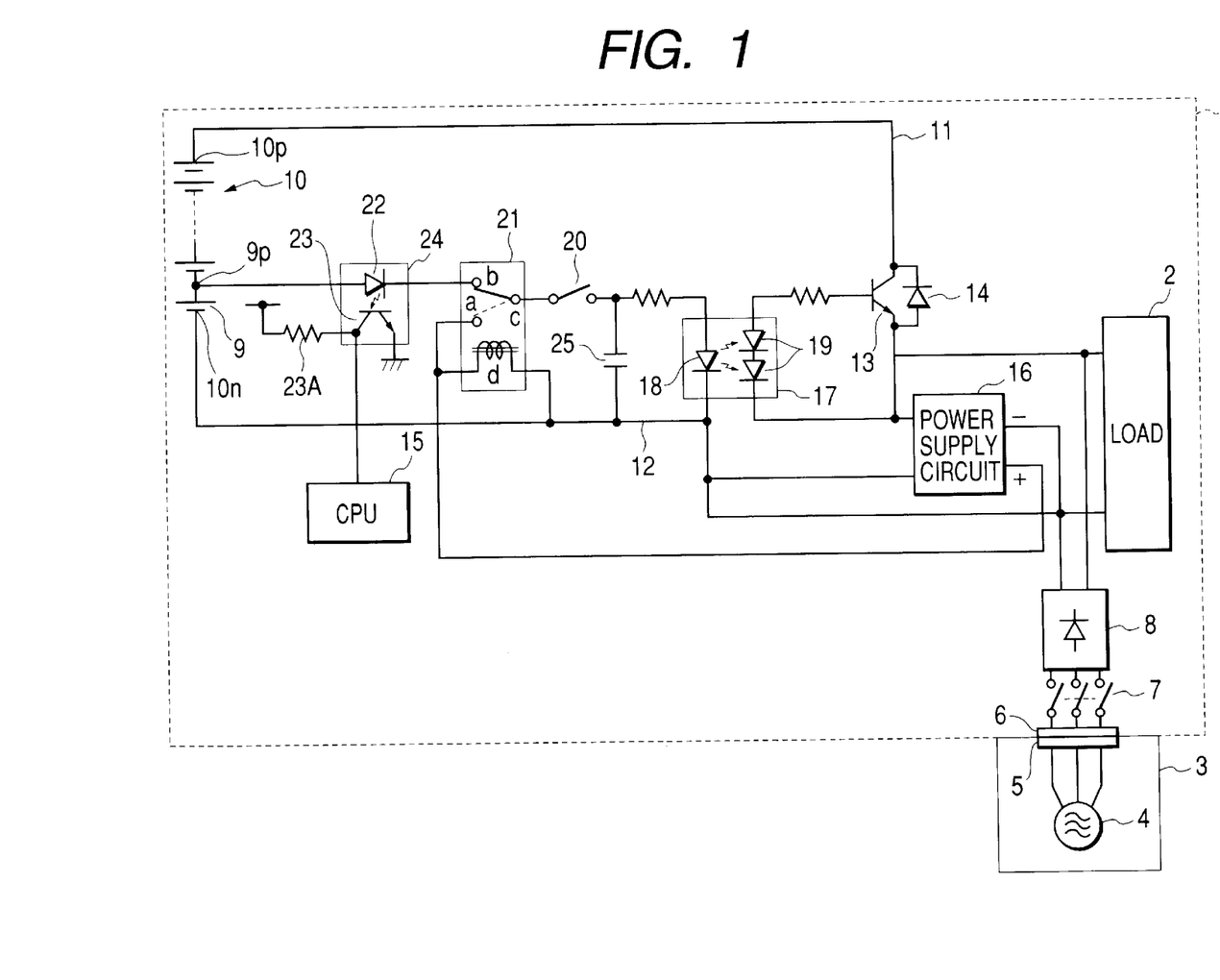
FIG. 1 is a diagram of electric portions of a mobile robot and a power feed apparatus according to a first embodiment of this invention.

FIG. 1 shows electric portions of a mobile robot 1 and a power feed apparatus 3 according to a first embodiment of this invention. The electric portion of the mobile robot 1 includes a load 2. The power feed apparatus 3 is provided on a work station.

The power feed apparatus 3 includes a three-phase AC (alternating current) power supply 4, and a power feed coupler 5 connected to the three-phase AC power supply 4. The mobile robot 1 is provided with a power reception coupler 6. When the mobile robot 1 stops at the work station, the power reception coupler 6 is connected with the power feed coupler 5 in the power feed apparatus 3. The mobile robot 1 includes a rectifying circuit 8 whose input side is connected with the power reception coupler 6 via a manual switch 7. The rectify circuit 8 has a positive-side output terminal and a negative-side output terminal connected with a positive-side input terminal and a negative-side input terminal of the load 2 respectively.

The mobile robot 1 includes an AC motor (not shown) for moving a robot body, and an AC motor (not shown) for driving a robot arm. The load 2 in the mobile robot 1 includes an inverter for converting DC (direct current) power into AC power having a voltage of 200 V. The AC power is fed from the inverter to the AC motors to activate them.

In the case where the mobile robot 1 stops at the work station and the power reception coupler 6 of the mobile robot 1 is connected with the power feed coupler 5 in the power feed apparatus 3, AC power is fed from the three-phase AC power supply 4 in the power feed apparatus 3 to the rectifying circuit 8 in the mobile robot 1 provided that the manual switch 7 is in its closed position (its on position). In this case, the AC power is rectified into DC power by the rectifying circuit 8, and the DC power is fed from the rectifying circuit 8 to the load 2. Accordingly, in this case, the load 2 in the mobile robot 1 receives electric power from the power feed apparatus 3.

On the other hand, in the case where the mobile robot 1 moves away from the work station and the power reception coupler 6 of the mobile robot 1 is disconnected from the power feed coupler 5 in the power feed apparatus 3, the power feed to the load 2 in the mobile robot 1 from the power feed apparatus 3 is interrupted and the load 2 receives electric power from an internal power supply in the mobile robot 1.

The internal power supply in the mobile robot 1 consists of a combination battery 10 forming a high-voltage battery. The combination battery 10 has cells 9 coupled together in series. Each of the cells 9 includes a secondary battery cell such as a nickel-cadmium battery cell. Normally, the combination battery 10 feeds 288-V DC power to the load 2, and the inverter in the load 2 converts the 288-V DC power into 200-V AC power.

The combination battery 10 and the load 2 can be selectively connected with and disconnected from each other as will be described below. The combination battery 10 has a positive terminal 10p and a negative terminal 10n forming a hot end and a cold end respectively. A positive-side bus line 11 and a negative-side bus line 12 are connected with the positive terminal 10p and the negative terminal 10n of the combination battery 10, respectively. The positive-side bus line 11 and the negative-side bus line 12 form a pair of power feed lines.

The positive-side bus line 11 leads to the collector of an NPN transistor 13 acting as a switching element for selectively blocking and unblocking a power feed path to the load 2. The emitter of the transistor 13 is connected with the positive-side input terminal of the load 2 and the positive-side output terminal of the rectifying circuit 8. The negative-side bus line 12 leads to the negative-side input terminal of the load 2 and the negative-side output terminal of the rectifying circuit 8. When the transistor 13 is in its on state (its conductive state), the load 2 can receive electric power from the combination battery 10. When the transistor 13 is in its off state (its non-conductive state), the power feed from the combination battery 10 to the load 2 is inhibited.

The anode of a diode 14 is connected with the emitter of the transistor 13. The cathode of the diode 14 is connected with the collector of the transistor 13. When the manual switch 7 is in its closed position and the power reception coupler 6 is connected with a charging apparatus (not shown), a current flows from the charging apparatus into the combination battery 10 via the rectifying circuit 8 and the diode 14 so that the cells 9 in the combination battery 10 are charged.

The mobile robot 1 includes a CPU 15 for controlling movement of the robot body and also movement of the robot arm. The CPU 15, a peripheral electronic circuit (not shown) with respect to the CPU 15, and other various electronic circuits (not shown) are powered by low voltages, for example, 24 V, 12 V, and 5 V, which are outputted from a power supply circuit 16. The power supply circuit 16 is connected in parallel with the load 2. Specifically, the power supply circuit 16 has a positive-side input terminal connected with the emitter of the transistor 13, and a negative-side input terminal connected with the negative-side bus line 12. Thus, the power supply circuit 16 receives electric power from the combination battery 10 when the transistor 13 is in its on state. The power supply circuit 16 derives the above-indicated low voltages from the received electric power. The power supply circuit 16 has pairs of positive-side and negative-side output terminals. The power supply circuit 16 includes a switching regulator and a voltage-dropping DC-DC converter.

The transistor 13 changes to its on state (its conductive state) when an activation voltage is applied between the base and the emitter thereof. The application of the activation voltage between the base and the emitter of the transistor 13 is implemented via a photo-voltage-coupler 17. The photo-voltage-coupler 17 includes a light emitting diode 18 and two photodiodes 19. The photodiodes 19 are optically coupled with the light emitting diode 18. The photodiodes 19 are electrically combined in series. The anode end of the combination of the photodiodes 19 is connected with the base of the transistor 13 via a resistor (no reference character). The cathode end of the combination of the photodiodes 19 is connected with the emitter of the transistor 13. The anode of the light emitting diode 18 is connected with a movable contact "c" of a relay 21 via a resistor (no reference character) and a manual switch 20. The manual switch 20 is used as a starting switch. The manual switch 20 includes a DC breaker. The cathode of the light emitting diode 18 is connected with the negative-side bus line 12. The manual switch 20 is ganged with the manual switch 7, and is changed between its on position (its closed position) and its off position (its open position) together with the manual switch 7.

In the photo-voltage-coupler 17, the light emitting diode 18 outputs light when being activated by electric power. The light travels from the light emitting diode 18 to the photodiodes 19, generating a voltage across the combination of the photodiodes 19. The generated voltage is applied between the base and the emitter of the transistor 13 as the activation voltage so that a base current flows through the transistor 13 and hence the transistor 13 changes to its on state. Accordingly, the photo-voltage-coupler 17 acts as a drive circuit for applying the activation voltage between the base and the emitter of the transistor 13 to change the transistor 13 to its on state.

The relay 21 includes a normally-open-side fixed contact "a", a normally-closed-side fixed contact "b", an armature (not shown), and a drive coil "d" in addition to the movable contact "c". The movable contact "c" is associated with the armature. The movable contact "c" is connected with the normally-closed-side fixed contact "b" and is disconnected from the normally-open-side fixed contact "a" when the drive coil "d" is de-energized. The movable contact "c" is disconnected from the normally-closed-side fixed contact "b" and is connected with the normally-open-side fixed contact "a" when the drive coil "d" is energized. The movable contact "c", the normally-open-side fixed contact "a", and the normally-closed-side fixed contact "b" compose a relay switch. Specifically, the movable contact "c" and the normally-open-side fixed contact "a" compose a normally-open switch. The movable contact "c" and the normally-closed-side fixed contact "b" compose a normally-closed switch.

The normally-closed-side fixed contact "b" of the relay 21 is connected with the cathode of a light emitting diode 22. The anode of the light emitting diode 22 is connected with the positive terminal of specified one of the cells 9 composing the combination battery 10. In other words, the anode of the light emitting diode 22 is connected with a predetermined junction between two adjacent cells among the cells 9 composing the combination battery 10. The predetermined junction corresponds to a predetermined tap between the hot end and the cold end of the combination battery 10. The voltage at the predetermined junction (the predetermined tap) is equal to the voltage of at least one cell 9 in the combination battery 10. For example, the anode of the light emitting diode 22 is connected with the positive terminal 9p of one of the cells 9 which is nearest to the negative terminal 10n of the combination battery 10. The cell 9 nearest to the negative terminal 10n of the combination battery 10 is referred to as the cold end cell 9. The negative terminal of the cold end cell 9 forms the negative terminal 10n of the combination battery. 10. The normally-open-side fixed contact "a" of the relay 21 is connected with a first positive-side output terminal of the power supply circuit 16. The drive coil "d" of the relay 21 is connected between the negative-side bus line 12 and the first positive-side output terminal of the power supply circuit 16.

A first negative-side output terminal of the power supply circuit 16 which pairs with the first positive-side output terminal thereof is connected with the negative-side bus line 12. The power supply circuit 16 subjects the normally-open-side fixed contact "a" and drive coil "d" of the relay 21 to a low voltage with respect to the negative-side bus line 12 which is substantially equal to the voltage of one cell 9 in the combination battery 10.

In the case where the movable contact "c" of the relay 21 is connected with the normally-closed-side fixed contact "b" thereof while the manual switch 20 is in its on position, the light emitting diode 18 in the photo-voltage-coupler 17 is operatively connected with the cold end cell 9 in the combination battery 10 via the manual switch 20, the relay 21, and the light emitting diode 22.

Thus, in this case, the cold end cell 9 in the-combination battery 10 serves as a power source for the light emitting diode 18 in the photo-voltage-coupler 17. On the other hand, in the case where the movable contact "c" of the relay 21 is connected with the normally-open-side fixed contact "a" thereof while the manual switch 20 is in its on position, the light emitting diode 18 in the photo-voltage-coupler 17 is connected with the output side of the power supply circuit 16 via the manual switch 20 and the relay 21. Thus, in this case, the power supply circuit 16 serves as a power source for the light emitting diode 18 in the photo-voltage-coupler 17.

When the power supply circuit 16 applies the above-indicated low voltage to the drive coil "d" of the relay 21, the armature of the relay 21 is moved toward the drive coil "d" so that the movable contact "c" of the relay 21 is disconnected from the normally-closed-side fixed contact "b" thereof and is connected with the normally-open-side fixed contact "a" thereof. As a result, the power source for the light emitting diode 18 in the photo-voltage-coupler 17 is changed from the cold end cell 9 in the combination battery 10 to the power supply circuit 16.

The light emitting diode 22 forms a photocoupler 24 in conjunction with a phototransistor 23. The phototransistor 23 is optically coupled with the light emitting diode 22. The collector of the phototransistor 23 is connected with an input port of the CPU 15. Also, the collector of the phototransistor 23 is connected via a resistor 23A with a second positive-side output terminal of the power supply circuit 16 which differs from the first positive-side output terminal thereof. The emitter of the phototransistor 23 is grounded. A second negative-side output terminal of the power supply circuit 16 which pairs with the second positive-side output terminal thereof is also grounded.

One end of a capacitor 25 is connected with the anode of the light emitting diode 18 in the photo-voltage-coupler 17 via the resistor (no reference character). The other end of the capacitor 25 is connected with the negative-side bus line 12, that is, the cathode of the light emitting diode 18. Accordingly, the capacitor 25 is connected in parallel with the light emitting diode 18. The capacitor 25 acts as a temporary power source for the light emitting diode 18 and prevents an interruption of power feed thereto when the movable contact "c" of the relay 21 is disconnected from the normally-closed-side fixed contact "b" thereof and is connected with the normally-open-side fixed contact "a" thereof.

When the movable contact "c" of the relay 21 is connected with the normally-closed-side fixed contact "b" thereof, a current is allowed to flow from the cold end cell 9 in the combination battery 10 toward the normally-closed-side fixed contact "b" of the relay 21 via the light emitting diode 22 of the photocoupler 24. When the movable contact "c" of the relay 21 is disconnected from the normally-closed-side fixed contact "b" thereof, a current is inhibited from flowing through the light emitting diode 22. In the case where a current flows through the light emitting diode 22, the light emitting diode 22 generates light. The generated light travels from the light emitting diode 22 to the phototransistor 23 in the photocoupler 24, changing the phototransistor 23 to its on state (its conductive state). In the absence of a current flowing through the light emitting diode 22, the phototransistor 23 remains in its off state (its nonconductive state). The voltage at the collector of the phototransistor 23 is high when the phototransistor 23 is in its off state. The voltage at the collector of the phototransistor 23 drops to a low level due to action of the resistor 23A when the phototransistor 23 changes to its on state. Accordingly, the phototransistor 23 responds to whether or not a current flows from the cold end cell 9 in the combination battery 10 toward the normally-closed-side fixed contact "b" of the relay 21. The phototransistor 23 acts as a sensor or a means for detecting the state of the switch of the relay 21.

The CPU 15 includes a combination of an input port, an output port, a processing section, a ROM, and a RAM. The CPU 15 operates in accordance with a control program stored in the ROM. The output port of the CPU 15 is connected with an informing means (not shown) such as a buzzer or a lamp. The control program is designed to enable the CPU 15 to implement processes as follows. The CPU 15 monitors the voltage at the collector of the phototransistor 23. The CPU 15 acts as a means for judging whether or not the relay 21 fails. The judging is based on a step of determining whether or not the voltage at the collector of the phototransistor 23 is high when the CPU 15 is started to operate as a result of the power feed thereto, or a step of determining whether or not the voltage at the collector of the phototransistor 23 changes from a low level to a high level in a prescribed time interval after the start of operation of the CPU 15. When it is judged that the relay 21 fails, the CPU 15 activates the informing means (not shown) to report the failure of the relay 21.

The mobile robot 1 in FIG. 1 operates as follows. When the manual switches 7 and 20 are changed to their on positions to start the drive of the load 2, a closed circuit is made which includes the positive terminal 9p of the cold end cell 9 in the combination battery 10, the light emitting diode 22 of the photocoupler 24, the connection between the normally-closed-side fixed contact "b" and the movable contact "c" of the relay 21, the manual switch 20, the light emitting diode 18 of the photo-voltage-coupler 17, the negative-side bus line 12, and the negative terminal of the cold end cell 9. Therefore, a current caused by the cold end cell 9 flows through the light emitting diode 18 of the photo-voltage-coupler 17, and hence the light emitting diode 18 generates light. The light generated by the light emitting diode 18 causes a voltage across the combination of the photodiodes 19 so that a base current flows through the transistor 13 and the transistor 13 changes to its on state. When the transistor 13 changes to its on state, a high voltage generated by the combination battery 10 is applied via the transistor 13 to the load 2 and the power supply circuit 16. As a result, the load 2 and the power supply circuit 16 start to operate.

The power supply circuit 16 generates low voltages on the basis of the high voltage applied from the combination battery 10.

One of the generated low voltages is impressed on the drive coil "d" of the relay 21 so that the movable contact "c" of the relay 21 is disconnected from the normally-closed-side fixed contact "b" thereof and is connected with the normally-open-side fixed contact "a" thereof. When the movable contact "c" of the relay 21 is connected with the normally-open-side fixed contact "a" thereof, a closed circuit is made which includes the first positive-side output terminal of the power supply circuit 16, the connection between the normally-open-side fixed contact "a" and the movable contact "c" of the relay 21, the manual switch 20, the light emitting diode 18 of the photo-voltage-coupler 17, the negative-side bus line 12, and the first negative-side output terminal of the power supply circuit 16. Therefore, a current caused by the power supply circuit 16 flows through the light emitting diode 18 of the photo-voltage-coupler 17. Thus, the power source for the light emitting diode 18 in the photo-voltage-coupler 17 is changed from the cold end cell 9 in the combination battery 10 to the power supply circuit 16. Accordingly, the light emitting diode 18 continues to generate light so that the transistor 13 remains in its on state.

When the manual switches 7 and 20 are changed to their on positions, the current caused by the cold end cell 9 flows also through the light emitting diode 22 of the photocoupler 24. The light emitting diode 22 generates light in response to the current flowing therethrough. The light generated by the light emitting diode 22 changes the phototransistor 23 of the photocoupler 24 to its on state. As a result, the voltage at the collector of the transistor 23 drops to a low level. At the later moment when the relay 21 changes the power source for the light emitting diode 18 in the photo-voltage-coupler 17 from the cold end cell 9 in the combination battery 10 to the power supply circuit 16, the flow of the current through the light emitting diode 22 is blocked. Therefore, the generation of light by the light emitting diode 22 is interrupted so that the voltage at the collector of the transistor 23 changes to a high level.

The CPU 15 starts to operate when receiving one of the low voltages generated by the power supply circuit 16. At or immediately after the start of operation, the CPU 15 determines whether or not the voltage at the collector of the phototransistor 23 is high. In the case where it is determined that the voltage at the collector of the phototransistor 23 is high, the CPU 15 judges the relay 21 to be normal. On the other hand, in the case where it is determined that the voltage at the collector of the phototransistor 23 is not high, the CPU 15 judges the relay 21 to be wrong. Furthermore, the CPU 15 determines whether or not the voltage at the collector of the phototransistor 23 changes from a low level to a high level in a prescribed time interval after the start of operation.

In the case where it is determined that the voltage at the collector of the phototransistor 23 changes from a low level to a high level in the prescribed time interval, the CPU 15 judges the relay 21 to be normal. On the other hand, in the case where it is determined that the voltage at the collector of the phototransistor 23 does not change from a low level to a high level in the prescribed time interval, the CPU 15 judges the relay 21 to be wrong. When the relay 21 is judged to be wrong, the CPU 15 activates the informing means (not shown) to report the failure of the relay 21.

The disconnection of the load 2 from the combination battery 10 is implemented by changing the manual switches 7 and 20 to their off positions. When the manual switches 7 and 20 are changed to their off positions, the flow of the current through the light emitting diode 18 of the photo-voltage-coupler 17 is blocked. As a result, the generation of light by the light emitting diode 18 is interrupted, and the voltage across the combination of the photodiodes 19 disappears. Thus, the base current does not flow through the transistor 13 so that the transistor 13 falls into its off state. When the transistor 13 falls into its off state, the application of the high voltage from the combination battery 10 to the load 2 and the power supply circuit 16 is interrupted. In other words, the load 2 is disconnected from the combination battery 2.

According to the first embodiment of this invention, the transistor 13 selectively blocks and unblocks the power feed path to the load 2, and the cold end cell 9 in the combination battery 10 is used as a power source for turning on the transistor 13. Thus, it is unnecessary to provide an auxiliary low-voltage battery for turning on the transistor 13 which is separate from the combination battery 10. Immediately after the load 2 is started to operate, the relay 21 changes the power source for the light emitting diode 18 in the photo-voltage-coupler 17 from the cold end cell 9 to the power supply circuit 16. Therefore, it is possible to prevent the cold end cell 9 from being significantly discharged relative to the other cells 9 in the combination battery 10.

In the event that the relay 21 fails to change the power source for the light emitting diode 18 in the photo-voltage-coupler 17 from the cold end cell 9 to the power supply circuit 16, the current continues to flow through the light emitting diode 22 of the photocoupler 24. Thus, in this case, the voltage at the collector of the phototransistor 23 in the photocoupler 24 remains low. The CPU 15 detects the failure of the relay 21 from the continuation of the low voltage at the collector of the phototransistor 23. The CPU 15 activates the informing means (for example, a buzzer or a lamp) to report the failure of the relay 15. Accordingly, a robot operator or a robot user is urged to take countermeasures against the failure of the relay 15. Therefore, it is possible to prevent the cold end cell 9 from being significantly discharged relative to the other cells 9 in the combination battery 10.

Even in the case where the electric power in the combination battery 10 is insufficient to activate the load 2, the electric power can be fed from the three-phase AC power supply 4 to the load 2 via the rectifying circuit 8 so that the load 2 can be sufficiently activated. Thus, even in such a case, the robot arm is prevented from being inactive.

Second Embodiment

Figure 2:
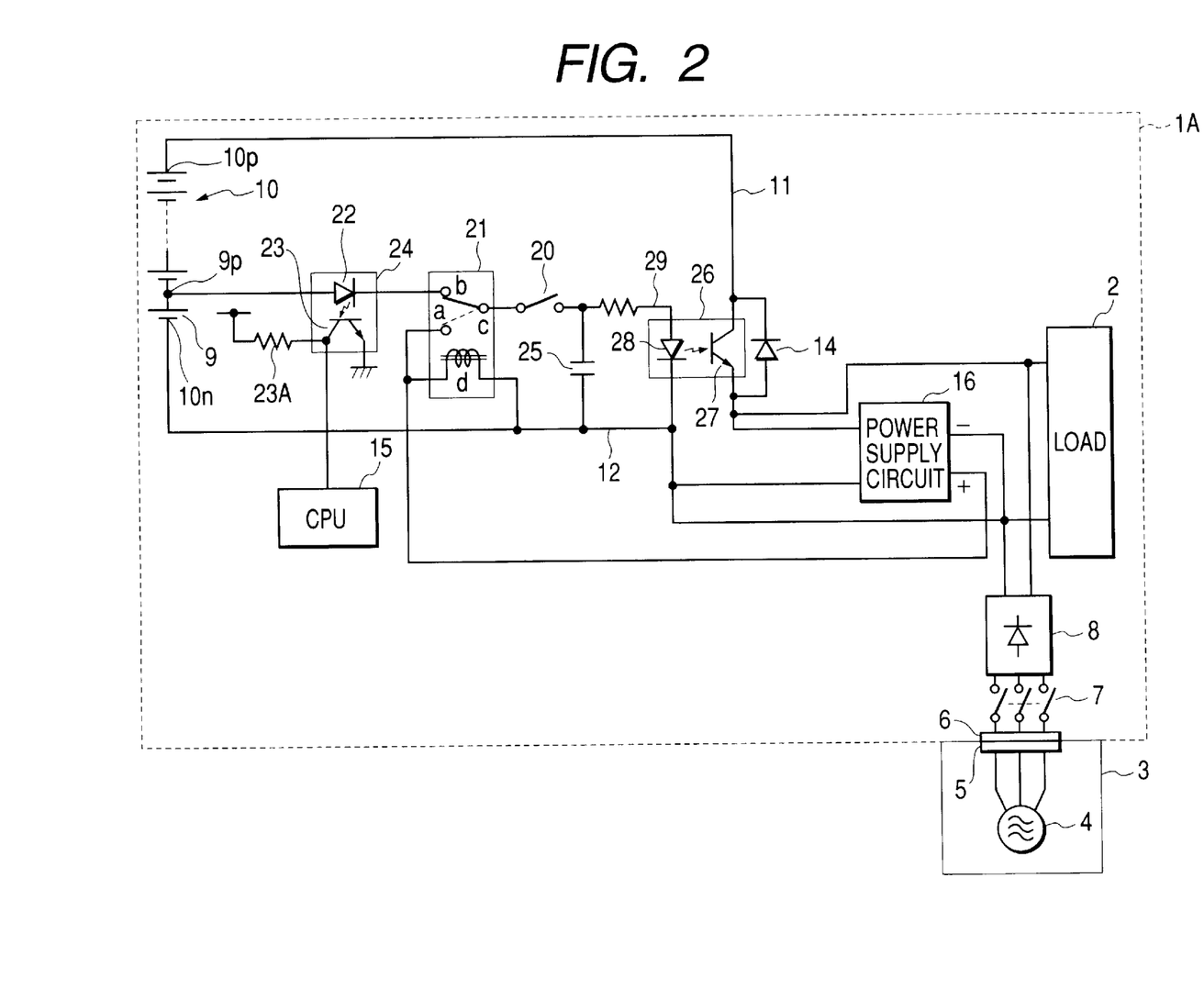
FIG. 2 is a diagram of electric portions of a mobile robot and a power feed apparatus according to a second embodiment of this invention.

FIG. 2 shows electric portions of a mobile robot 1A and a power feed apparatus 3 according to a second embodiment of this invention. The second embodiment of this invention is similar to the first embodiment (see FIG. 1) thereof except for design changes mentioned hereafter. The mobile robot 1A is a modification of the mobile robot 1 in FIG. 1.

In the mobile robot 1A of FIG. 2, a switching element for selectively blocking and unblocking a power feed path to a load 2 includes a phototransistor 27 of a photocoupler 26. The collector of the phototransistor 27 is connected with a positive-side bus line 11. The emitter of the phototransistor 27 is connected with a positive-side input terminal of the load 2 and also a positive-side input terminal of a power supply circuit 16. The phototransistor 27 is optically coupled with a light emitting diode 28 in the photocoupler 26. The anode of the light emitting diode 28 is connected to a manual switch 20 via a portion of a power feed line 29 which includes a resistor (no reference character). The cathode of the 20 light emitting diode 28 is connected with a negative-side bus line 12. The power feed line 29 connects a movable contact "c" of a relay 21 and the anode of the light emitting diode 28. The manual switch 20 is interposed in the power feed line 29. The power feed line 29 forms a portion of a drive circuit for applying an activation voltage to the light emitting diode 28 to turn on the phototransistor 27.

When the manual switch 20 is changed to its on position, the connection of the light emitting diode 28 with a cold end cell 9 in a combination battery 10 is established so that a current caused by the cold end cell 9 flows through the light emitting diode 28. As a result, the light emitting diode 28 generates light. The generated light travels from the light emitting diode 28 to the phototransistor 27, changing the phototransistor 27 to its on state (its conductive state). When the phototransistor 27 changes to its on state, a high voltage generated by the combination battery 10 is applied via the phototransistor 27 to the load 2 and the power supply circuit 16. Therefore, the load 2 and the power supply circuit 16 start to operate. At a later moment, the relay 21 connects the light emitting diode 28 with the power supply circuit 16 instead of the cold end cell 9, and the light emitting diode 28 continues to generate light so that the phototransistor 27 remains in its on state.

Third Embodiment

Figure 3:
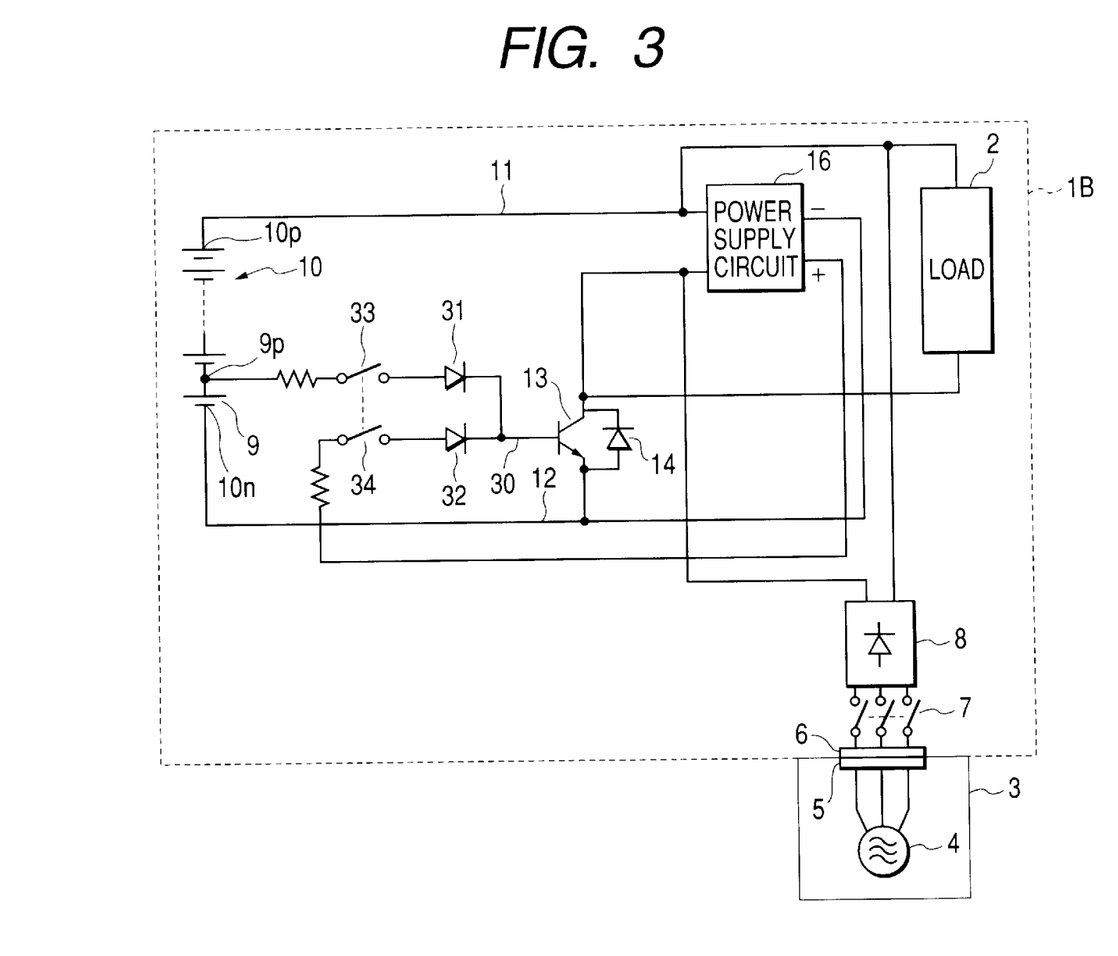
FIG. 3 is a diagram of electric portions of a mobile robot and a power feed apparatus according to a third embodiment of this invention.

FIG. 3 shows electric portions of a mobile robot 1B and a power feed apparatus 3 according to a third embodiment of this invention. The third embodiment of this invention is similar to the first embodiment (see FIG. 1) thereof except for design changes mentioned hereafter. The mobile robot 1B is a modification of the mobile robot 1 in FIG. 1.

In the mobile robot 1B of FIG. 3, a positive-side bus line 11 leads to a positive-side input terminal of a load and also a positive-side input terminal of a power supply circuit 16. A negative-side bus line 12 leads to an emitter of a transistor 13. The collector of the transistor 13 is connected with a negative-side input terminal of the load 2 and also a negative-side input terminal of the power supply circuit 16.

A power feed line 30 is connected among the base of the transistor 13, the cathode of a diode 31, and the cathode of a diode 32. The power feed line 30 forms a portion of a drive circuit for applying an activation voltage between the base and the emitter of the transistor 13 to turn on the transistor 13. The diodes 31 and 32 act as rectifying elements, respectively. The diodes 31 and 32 cooperate as a switch or a changing means. The anode of the diode 31 is connected with the positive terminal 9p of a cold end cell 9 in a combination battery 10 via a manual switch 33 and a resistor (no reference character). The manual switch 33 is used as a starting switch. The anode of the diode 32 is connected with a first positive-side output terminal of the power supply circuit 16 via a manual switch 34 and a resistor (no reference character). The manual switch 34 is used as a starting switch.

The power supply circuit 16 subjects its first positive-side output terminal to a voltage higher than a voltage across one cell 9 (the cold end cell 9) in the combination battery 10. The manual switches 33 and 34 are ganged with each other. Thus, the manual switches 33 and 34 are synchronously changed between their on positions and their off positions. In addition, the manual switches 33 and 34 are ganged with a manual switch 7. Accordingly, the manual switches 33, 34, and 7 are synchronously changed between their on positions and their off positions.

A power source for setting the transistor 13 in its on state is formed by either the cold end cell 9 in the combination battery 10 or the power supply circuit 16. A means for changing the power source from the cold end cell 9 to the power supply circuit 16 is provided by the following first and second designs. The first design is that the voltage applied from the power supply circuit 16 to its first positive-side output terminal is higher than the voltage across one cell 9 in the combination battery 10. The second design is that the power feed line 30 leading to the base of the transistor 13 is connected to the cold end cell 9 and the power supply circuit 16 via the diodes 31 and 32 respectively.

When the manual switches 33 and 34 are changed to their on positions, the base of the transistor 13 is connected with the cold end cell 9 in the combination battery 10 and the first positive-side output terminal of the power supply circuit 16. At this moment, the power supply circuit 16 is still inactive. Thus, a current caused by the cold end cell 9 flows through the transistor 13 as a base current so that the transistor 13 changes to its on state. In this case, the diode 32 prevents the current from flowing toward the first positive-side output terminal of the power supply circuit 16. When the transistor 13 changes to its on state, a high voltage generated by the combination battery 10 is applied via the transistor 13 to the load 2 and the power supply circuit 16. As a result, the load 2 and the power supply circuit 16 start to operate.

The power supply circuit 16 generates low voltages on the basis of the high voltage applied from the combination battery 10. One of the generated low voltages is impressed on the base of the transistor 13 via the first positive-side output terminal of the power supply circuit 16. Since the voltage applied from the power supply circuit 16 to its first positive-side output terminal is higher than the voltage across the cold end cell 9 in the combination battery 10, the flow of the current from the cold end cell 9 to the base of the transistor 13 is blocked and a current caused by the power supply circuit 16 flows through the transistor 13 as a base current. In this way, the power source for setting the transistor 13 in its on state is changed from the cold end cell 9 to the power supply circuit 16. Accordingly, the base current continues to flow through the transistor 13, and the transistor 13 remains in its on state. Since the power source for setting the transistor 13 in its on state is changed from the cold end cell 9 to the power supply circuit 16, it is possible to prevent the cold end cell 9 from being significantly discharged relative to the other cells 9 in the combination battery 10. The diode 31 blocks a flow of a current from the power supply circuit 16 toward the cold end cell 9.

When the manual switches 33 and 34 are changed to their off positions, the base current does not flow through the transistor 13 so that the transistor 13 falls into its off state. When the transistor 13 falls into its off state, the application of the high voltage from the combination battery 10 to the load 2 and the power supply circuit 16 is interrupted. In other words, the load 2 is disconnected from the combination battery 2.

The third embodiment of this invention features that the cold end cell 9 and the power supply circuit 16 are connected via the diodes 31 and 32 to the base of the transistor 13 on a parallel basis, and the voltage outputted from the power supply circuit 16 is higher than the voltage across the cold end cell 9. According to this featuring design, the cold end cell 9 turns on the transistor 13, and then the power supply circuit 16 automatically replaces the cold end cell 9 and keeps the transistor 13 in its on state. The second embodiment of this invention is simple in structure and low in cost.

Fourth Embodiment

Figure 4:
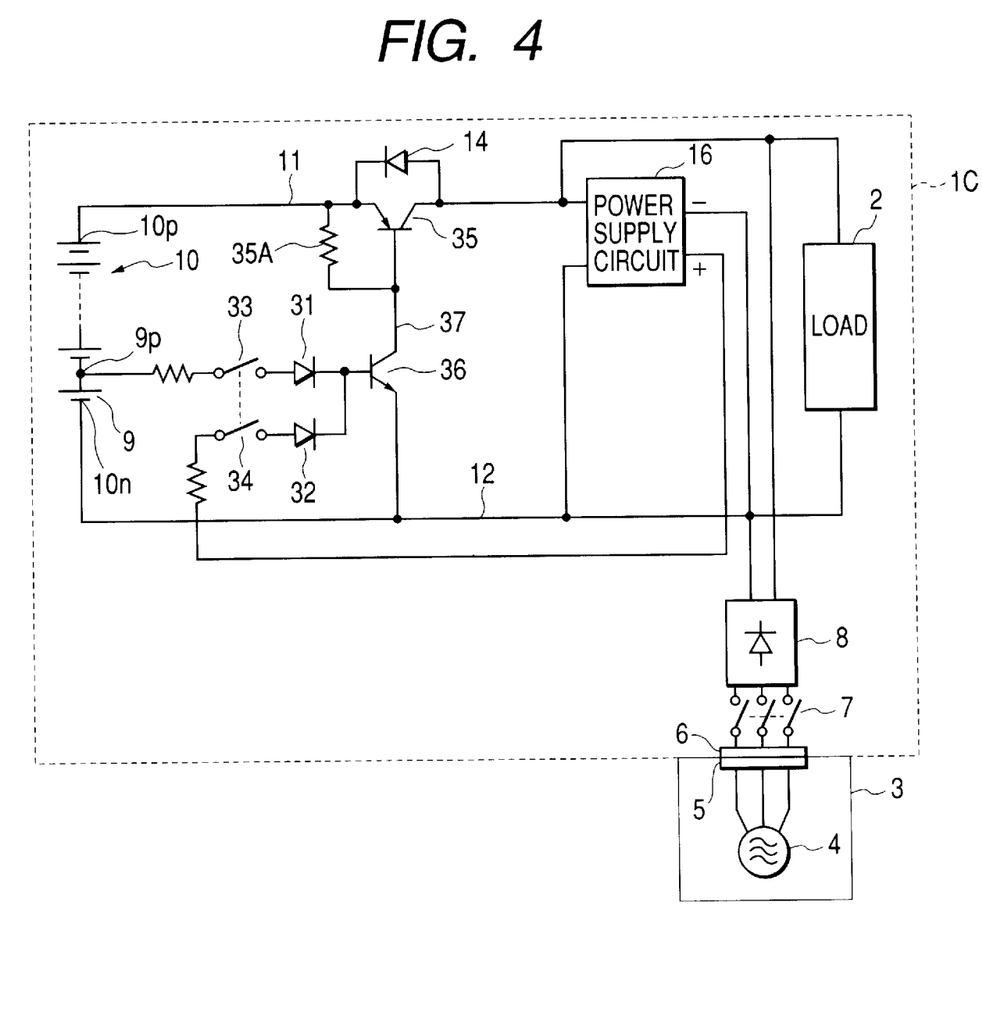
FIG. 4 is a diagram of electric portions of a mobile robot and a power feed apparatus according to a fourth embodiment of this invention.

FIG. 4 shows electric portions of a mobile robot 1C and a power feed apparatus 3 according to a fourth embodiment of this invention. The fourth embodiment of this invention is similar to the third embodiment (see FIG. 3) thereof except for design changes mentioned hereafter. The mobile robot 1C is a modification of the mobile robot 1B in FIG. 3.

In the mobile robot 1C of FIG. 4, a switching element for selectively blocking and unblocking a power feed path to a load 2 includes a PNP transistor 35 instead of the NPN transistor 13 (see FIG. 3). The emitter of the transistor 35 is connected with a positive-side bus line 11. The collector of the transistor 35 is connected with a positive-side input terminal of the load 2 and also a positive-side input terminal of a power supply circuit 16. The cathode of a diode 14 is connected to the emitter of the transistor 35. The anode of the diode 14 is connected to the collector of the transistor 35.

The base of the transistor 35 is connected with the collector of an NPN transistor 36. One end of a resistor 35A is connected with the positive-side bus line 11. The other end of the resistor 35A is connected with the junction between the base of the transistor 35 and the collector of the transistor 36. The emitter of the transistor 36 is connected with a negative-side bus line 12. The base of the transistor 36 is connected with the cathodes of diodes 31 and 32.

When manual switches 33 and 34 are changed to their on positions, the base of the transistor 36 is connected with a cold end cell 9 in a combination battery 10 and a first positive-side output terminal of the power supply circuit 16. At this moment, the power supply circuit 16 is still inactive. Thus, a current caused by the cold end cell 9 flows through the transistor 36 as a base current so that the transistor 36 changes to its on state (its conductive state). When the transistor 36 changes to its on state, the base of the transistor 35 is operatively connected with the negative-side bus line 12. As a result, a base current flows through the transistor 35 so that the transistor 35 changes to its on state. When the transistor 35 changes to its on state, a high voltage generated by the combination battery 10 is applied via the transistor 35 to the load 2 and the power supply circuit 16. As a result, the load 2 and the power supply circuit 16 start to operate.

The power supply circuit 16 generates low voltages on the basis of the high voltage applied from the combination battery 10. One of the generated low voltages is impressed on the base of the transistor 36 via the first positive-side output terminal of the power supply circuit 16. The voltage applied from the power supply circuit 16 to its first positive-side output terminal is higher than the voltage across the cold end cell 9 in the combination battery 10. Thus, the flow of the current from the cold end cell 9 to the base of the transistor 36 is blocked and a current caused by the power supply circuit 16 flows through the transistor 36 as a base current. In this way, the power source for setting the transistor 36 in its on state is changed from the cold end cell 9 to the power supply circuit 16. Accordingly, the base current continues to flow through the transistor 36, and the transistor 36 remains in its on state. Thus, also the transistor 35 remains in its on state.

A power feed line 37 connected between the base of the transistor 35 and the negative-side bus line 12 includes the transistor 36. The power feed line 37 forms a portion of a drive circuit for applying an activation voltage between the emitter and the base of the transistor 35 to turn on the transistor 35.

Fifth Embodiment

Figure 5:
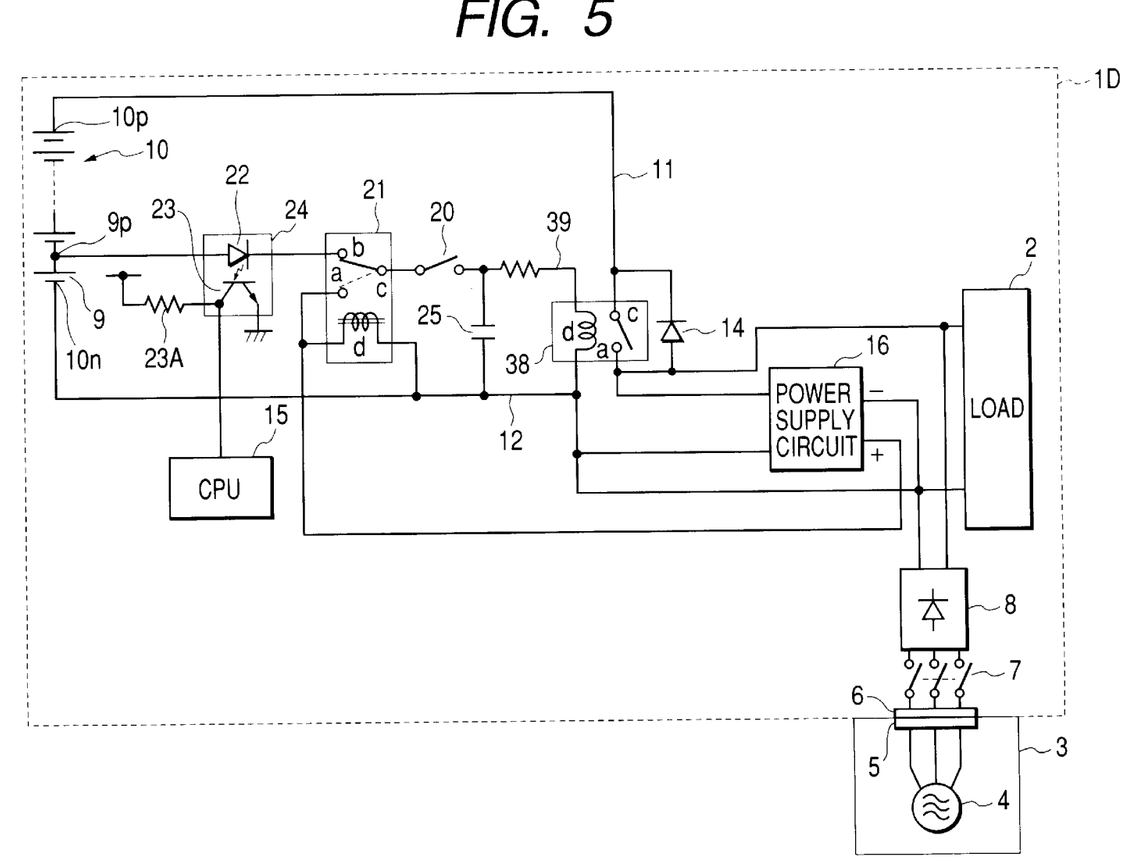
FIG. 5 is a diagram of electric portions of a mobile robot and a power feed apparatus according to a fifth embodiment of this invention.

FIG. 5 shows electric portions of a mobile robot 1D and a power feed apparatus 3 according to a fifth embodiment of this invention. The fifth embodiment of this invention is similar to the first embodiment (see FIG. 1) thereof except for design changes mentioned hereafter. The mobile robot 1D is a modification of the mobile robot 1 in FIG. 1.

In the mobile robot 1D of FIG. 5, a switching element for selectively blocking and unblocking a power feed path to a load 2 includes a relay 38. The relay 38 has a movable contact "c", a normally-open-side fixed contact "a", a drive coil "d", and an armature (not shown). The movable contact "c" is associated with the armature. The movable contact "c" and the normally-open-side fixed contact "a" compose a switch of the relay 38. In the relay 38, the movable contact "c" is connected with the normally-open-side fixed contact "a" when the drive coil "d" is energized. On the other hand, the movable contact "c" is disconnected from the normally-open-side fixed contact "a" when the drive coil "d" is de-energized.

The movable contact "c" of the relay 38 is connected with a positive-side bus line 11. The normally-open-side fixed contact "a" of the relay 38 is connected with a positive-side input terminal of the load 2 and also a positive-side input terminal of a power supply circuit 16. One end of the drive coil "d" of the relay 38 is connected with a manual switch 20 via a resistor (no reference character). The other end of the drive coil "d" of the relay 38 is connected with a negative-side bus line 12. The cathode of a diode 14 is connected with the movable contact "c" of the relay 38. The anode of the diode 14 is connected with the normally-open-side fixed contact "a" of the relay 38.

When the manual switch 20 is changed to its on position, the drive coil "d" of the relay 38 is coupled with a cold end cell 9 in a combination battery 10 so that a current caused by the cold end cell 9 flows through the drive coil "d". As a result, the armature of the relay 38 is moved toward the drive coil "d" thereof, and hence the movable contact "c" of the relay 38 is connected with the normally-open-side fixed contact "a" thereof. When the movable contact "c" of the relay 38 is connected with the normally-open-side fixed contact "a" thereof, a high voltage generated by the combination battery 10 is applied to the load 2 and the power supply circuit 16. As a result, the load 2 and the power supply circuit 16 start to operate.

The power supply circuit 16 generates low voltages on the basis of the high voltage applied from the combination battery 10. One of the generated low voltages is impressed on a drive coil "d" of a relay 21 so that a movable contact "c" of the relay 21 is disconnected from a normally-closed-side fixed contact "b" thereof and is connected with a normally-open-side fixed contact "a" thereof. When the movable contact "c" of the relay 21 is connected with the normally-open-side fixed contact "a" thereof, a current caused by the power supply circuit 16 flows through the drive coil "d" of the relay 38. Thus, the current continues to flow through the drive coil "d" of the relay 38, and the movable contact "c" of the relay 38 remains connected with the normally-open-side fixed contact "a" thereof.

A power feed line 39 connects the movable contact "c" of the relay 21 and the drive coil "d" of the relay 38. The manual switch 20 is interposed in the power feed line 39. The power feed line 39 forms a portion of a drive circuit for applying an activation voltage to the drive coil "d" of the relay 38 to turn on the switch of the relay 38.

Sixth Embodiment

A sixth embodiment of this invention is similar to one of the first, second, third, and fourth embodiments (see FIGS. 1, 2, 3, and 4) thereof except for the following design change. In the sixth embodiment of this invention, a switching element for selectively blocking and unblocking a power feed path to a load 2 includes a non-transistor-type device or a suitable device different from the transistor 13, 27, or 35.

Seventh Embodiment

A seventh embodiment of this invention is modified from one of the first to sixth embodiments thereof. The seventh embodiment of this invention is directed to an apparatus which differs from a mobile robot, and in which a combination battery activates a load.

What is claimed is:

1. An apparatus for starting the drive of a load by a high-voltage battery, comprising:

a combination battery including a plurality of cells connected together in series;

a power feed path between the combination battery and the load;

a switching element for selectively blocking and unblocking the power feed path, the switching element being changed to its on state when receiving a drive voltage;

a starting switch;

a drive circuit connected with at least one cell among the cells in the combination battery and using said at least one cell as a power source to generate the drive voltage when the starting switch is moved to its on position, the drive circuit applying the drive voltage to the switching element;

a power supply circuit connected with the power feed path and the switching element, and receiving an output voltage from the combination battery and starting to operate when the switching element is changed to its on state, the power supply circuit dropping the output voltage from the combination battery to generate a dropped voltage; and means for changing a power source for setting the switching element in its on state from said at least one cell to the power supply circuit in response to the dropped voltage generated by the power supply circuit.

2. An apparatus as recited in claim 1, wherein the changing means comprises a relay including a drive coil and a relay switch, and the relay switch changes the power source for setting the switching element in its on state from said at least one cell to the power supply circuit when the dropped voltage generated by the power supply circuit is applied to the drive coil.

3. An apparatus as recited in claim 1, wherein the changing means comprises 1) means for setting the dropped voltage generated by the power supply circuit to a level higher than an output voltage of said at least one cell, and 2) means for connecting the drive circuit to both said at least one cell and the power supply circuit, wherein the output voltage of said at least one cell is applied to the drive circuit and the switching element is changed to its on state when the starting switch is moved to its on position, and wherein after the power supply circuit is started to operate, the dropped voltage generated by the power supply circuit is applied to the drive circuit and the switching element is kept in its on state.

4. An apparatus as recited in claim 3, further comprising a rectifying element provided in a power feed line connected between the drive circuit and said at least one cell, the rectifying element allowing a flow of a current from said at least one cell to the drive circuit and blocking a flow of a current from the drive circuit to said at least one cell.

5. An apparatus as recited in claim 1, further comprising means provided in a power feed line between the changing means and said at least one cell for sensing a current flowing in the power feed line, and detecting a changing state of the changing means in response to the sensed current.

6. An apparatus as recited in claim 1, further comprising a rectifying circuit for converting an AC power into a DC power, and means for feeding the DC power to the load.

7. An apparatus for starting the drive of a load by a high-voltage battery, comprising:

a combination battery including a plurality of cells connected together in series, the combination battery having a tap between its hot end and its cold end;

a power feed path between the combination battery and the load;

a switching element being changed to an on state when receiving a drive voltage, and being changed to an off state when being released from the drive voltage, the switching element unblocking the power feed path when being changed to the on state, and blocking the power feed patch when being changed to the off state;

a starting switch movable to an on position;

first means for, when the starting switch moves to the on position, generating a first control voltage from a voltage at the tap of the combination battery and applying the first control voltage to the switching element as the drive voltage to change the switching element to the on state;

second means for generating a second control voltage from an output voltage of the combination battery when the switching element is changed to the on state by the first means; and third means for applying the second control voltage to the switching element as the drive voltage instead of the first control voltage to keep the switching element in the on state.

* * * * *